United States Patent [19]

Kollmeier et al.

[11] 4,417,068
[45] Nov. 22, 1983

[54] PROCESS FOR THE ADDITION OF ORGANIC SILICON COMPOUNDS WITH SIH GROUPS TO COMPOUNDS WITH OLEFINIC DOUBLE BONDS

[75] Inventors: Hans-Joachim Kollmeier, Essen; Rolf-Dieter Langenhagen, Hattingen Niederwenigern, both of Fed. Rep. of Germany

[73] Assignee: Th. Goldschmidt AG, Essen, Fed. Rep. of Germany

[21] Appl. No.: 407,326

[22] Filed: Aug. 12, 1982

[30] Foreign Application Priority Data

Aug. 27, 1981 [DE] Fed. Rep. of Germany ....... 3133869

[51] Int. Cl.³ .............................. C07F 7/08; C07F 7/10; C07F 71/8
[52] U.S. Cl. .................................... 556/479; 549/214; 549/215
[58] Field of Search ........................................ 260/479

[56] References Cited

U.S. PATENT DOCUMENTS

| 3,159,662 | 12/1964 | Ashby | 556/479 X |
|---|---|---|---|
| 3,313,773 | 4/1967 | Lamoreaux | 556/479 X |
| 3,439,014 | 4/1969 | Patton et al. | 556/479 X |
| 3,516,946 | 6/1970 | Modic | 556/479 X |
| 3,631,086 | 12/1971 | Seyfried et al. | 556/479 X |
| 3,864,372 | 2/1975 | Svoboda et al. | 556/479 |
| 4,288,375 | 9/1981 | Arai et al. | 260/348.41 |

Primary Examiner—Paul F. Shaver
Attorney, Agent, or Firm—Toren, McGeady and Stanger

[57] ABSTRACT

In a process for the addition of silanes or siloxanes having SiH groups to compounds with olefinic double bonds, the invention relates to the use of catalysts of the general formula $$YX_2(NH_3)_2$$

in which Y is a platinum or palladium radical, and
X is a chlorine, bromine or iodine radical or the $NO_2$ group.

The catalysts have a high selectivity. Side reactions and disproportionation reactions are avoided.

7 Claims, No Drawings

PROCESS FOR THE ADDITION OF ORGANIC SILICON COMPOUNDS WITH SIH GROUPS TO COMPOUNDS WITH OLEFINIC DOUBLE BONDS

BACKGROUND OF THE INVENTION

1. Field of the Invention

The invention relates to a process for the addition of silanes or siloxanes which have SiH groups but are free of substituents which, after splitting off from the silicon atom, act as proton acceptors, to compounds with olefinic double bonds in the presence of catalysts of the platinum group.

2. Description of the Prior Art

The use of platinum catalysts for the addition of silanes or siloxanes with SiH groups to compounds with one or more olefinic double bonds is known and described, for example, in the book "Chemie und Technologie der Silicone" (Chemistry and Technology of the Silicones), Chemie Publishing House, 1960, page 43, and in the patent literature, for example, in German Offenlegungsschrift No. 26 46 726. In this connection, $H_2PtCl_6.6H_2O$ is mentioned as the preferred catalyst.

This addition reaction, however, proceeds without an appreciable formation of by-products only if the compounds which have the olefinic double bonds are free of groups which can react with the SiH group in competition with the addition reaction. This includes particularly the carbon-linked hydroxyl group. The competing reactions can be represented as follows:

1. Addition reaction:

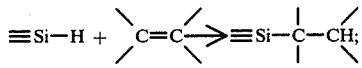

2. Competing Reaction:

In practice, it frequently happens that hydrogen silanes or hydrogen siloxanes must be added to compounds with olefinic unsaturations, which also have hydroxyl groups or other reactive groups. An example of such a reaction is the addition of a hydrogen siloxane to an alcohol or polyether of the following general formula.

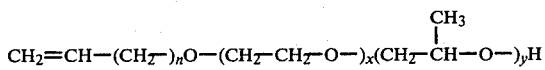

in which
n=0 to 10,
x=0 to 100,
y=0 to 100, and when
x and y=0, n≧1.

Such conversion products of polyether alcohols with hydrogen siloxanes play an important role as foam stabilizers in the production of polyurethane foams as well as surfactants in other areas of application, for example, in the cosmetics, paint and textile industries.

There is thus a need for a catalyst which, on the one hand, has a high activity with respect to the addition of the SiH group to olefinic double bonds and, on the other, minimizes the side reactions. Besides the aforementioned competing reaction in the form of the reaction of the SiH group with the COH group, it is desired to also avoid disproportionation reactions within the silane or siloxane compounds. Such disproportionation reactions are understood to include a redistribution of the SiH groups usually present in the mixture of silanes or siloxanes.

Further side reactions or secondary reactions are the conversion of the allyl groups used into propenyl groups or the possible crosslinking of the addition compounds having terminal OH groups via an acetal formation with the propenyl ether groups. Both reactions are promoted by acidic catalysts, such as, for example, $H_2PtCl_6.6H_2O$ and lead, on the one hand, to an inadequate conversion of the SiH groups and, on the other, to an increase in viscosity of the end product.

SUMMARY OF THE INVENTION

We have discovered a catalyst which is particularly selective for the addition of SiH groups to olefinic double bonds and which also minimizes the above-noted side and secondary reactions mentioned above.

Surprisingly, we have found that this can be accomplished by using compounds of the general formula $$YX_2(NH_3)_2$$

in which
Y is a platinum or palladium radical;
X is a chlorine, bromine or iodine radical or the $NO_2$ group in catalytically effective amounts for the process of the SiH addition to olefinic double bonds.

DESCRIPTION OF THE PREFERRED EMBODIMENT

The platinum-containing catalysts are especially preferred. The catalysts may also be present as stereoisomers in their cis or trans form. In this connection, compounds present in the cis form are particularly effective.

The amount of platinum catalyst to be used depends on the reactivity and the molecular weight of the reaction partners. In general, $10^{-2}$ to $10^{-8}$ moles and, preferably, $10^{-3}$ to $10^{-6}$ moles of the aforementioned catalysts are used per mole of SiH groups in the silane or siloxane.

Usually, an excess of the compounds with the olefinic double bonds will be used, in order to ensure that the SiH groups contained in the silane or siloxane react as quantitatively as possible.

For carrying out the reaction, it is advisable to add the catalyst to the compound with the olefinic groups first, and then to add the hydrogen silane or hydrogen siloxane so that the reaction between the excess of compounds with unsaturated, olefinic groups and those having the SiH groups is as uniform as possible. The catalyst can be completely or partially dissolved in the compound with the olefinic groups. In this connection, the degree of solubility of the catalysts depends on the polarity of the compounds with olefinic double bonds. If the compounds with olefinic double bonds are, for example, those which at the same time have hydroxyl groups, such as the above-mentioned unsaturated polyetherols, the solubility of the catalysts is adequate. If the percentage of hydroxyl groups is small, for example, due to higher molecular weights, or if there are few or no hydroxyl groups present, the solubility of the catalysts may be so reduced that the additional use of solvents for the catalyst can be advantageous. Dimethylformamide is an example of a solvent suitable for this purpose.

It is, of course, possible to carry out the entire reaction in a solvent, the solvents selected being inert with respect to the reaction partners. Examples of such solvents are, in particular, benzene, toluene and xylene.

The desired addition reaction begins to take place at room temperature. The use of higher temperatures is, however, recommended. Temperatures of 25° to 150° C. and, especially, temperatures between 50° to 120° C. are preferred. When using a solvent, the upper temperature is limited by the boiling point of the solvent.

The silanes or siloxanes must be free of substituents which can split off from the silicon atom and then react as proton acceptors, because they would be capable of reacting with the catalyst and, in so doing, inactivate it. Examples of such groups, which cannot be tolerated in large quantities are silicon-halogen groups, silicon-sulfonic acid groups and silicon-sulfate groups.

The catalysts which are to be used in the inventive process and which have the general formula $$YX_2(NH_3)_2$$

are known and described in "Gmelins Handbuch der Anorganischen Chemie" (Handbook of Inorganic Chemistry), 8th Edition, volume 68, part D, 1957. The synthesis of the reaction partners, that is, of the silanes or siloxanes having SiH groups, as well as of the organic compounds having olefinic double bonds, is also known. The silanes or siloxanes are described, for example, in the book "Chemie und Technologie der Silicone" (Chemistry and Technology of the Silicones), Chemie Publishing House, 1980.

Examples of suitable organosilicon compounds with SiH groups are monomeric silanes, such as, for example, $R_3SiH$, $R_2SiH_2$, $RSiH_3$;

cyclic silanes, such as, for example, $(RHSiO)_4$, $(RHSiO)_3$;

linear or branched oligomeric or polymeric siloxanes

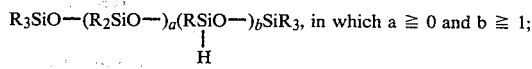
$R_3SiO-(R_2SiO-)_a(RSiO-)_bSiR_3$, in which $a \geq 0$ and $b \geq 1$;
          |
          H

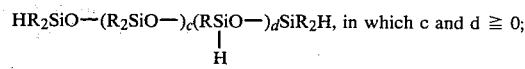
$HR_2SiO-(R_2SiO-)_c(RSiO-)_dSiR_2H$, in which c and d $\geq 0$;
          |
          H

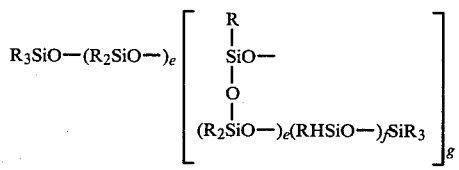
$$R_3SiO-(R_2SiO-)_e\begin{bmatrix} R \\ | \\ SiO- \\ | \\ O \\ | \\ (R_2SiO-)_e(RHSiO-)_fSiR_3 \end{bmatrix}_g$$

$(RHSiO-)_fSiR_3$ in which $e \geq 0$, $f \geq 1$ and $g \geq 1$.

In the above formulas, R represents groups which do not hinder the addition reaction, such as, alkyl groups with 1 to 8 carbon atoms, substituted alkyl groups with 1 to 8 carbon atoms, such as, the 3-chloropropyl, the 1-chloromethyl or the 3-cyanopropyl group; aryl groups, such as, the phenyl group; aralkyl groups, such as, the benzyl group; alkoxy or alkoxyalkyl groups, such as, the ethoxy or ethoxypropyl group. R can also have different meanings within a molecule. However, compounds in which all the R radicals or the predominant number of R radicals represent a methyl radical, are preferred.

Examples of suitable organocarbon compounds with olefinic double bonds are compounds of the formula

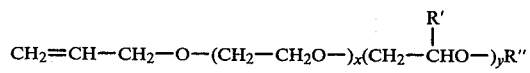
$$CH_2=CH-CH_2-O-(CH_2-CH_2O-)_x(CH_2-\underset{R'}{\overset{|}{C}}HO-)_yR''$$

in which
x=0 to 100,
y=0 to 100,
R'=is an optionally substituted alkyl group with 1 to 4 carbon atoms; and
R''=is a hydrogen atom or an alkyl group with 1 to 4 carbon atoms, the $$-\underset{R'''}{\overset{|}{C}}=O,$$

in which R''' is an alkyl radical, the —CH$_2$OR' or

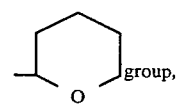
group, an alkaryl group, such as, the benzyl group or the $$-\underset{NH-R'}{\overset{|}{C}}=O \quad \text{group.}$$

Moreover, the following compounds are, for example, suitable

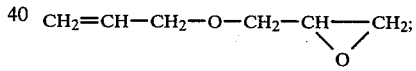
$CH_2=CH-CH_2-O-CH_2-CH\underset{O}{\overset{\diagdown\diagup}{-}}CH_2$;

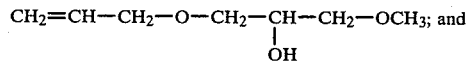
$CH_2=CH-CH_2-O-CH_2-\underset{OH}{\overset{|}{C}}H-CH_2-OCH_3$; and $CH_2=CH-CH_2-O-CH_2-CH_2-CN.$ The catalysts to be used in the inventive process demonstrate the high selectivity required for the addition reaction, lead to high reaction yields, and avoid possible disproportionation within the siloxane component.

The selectivity of the catalysts to be used for the process is shown clearly by the fact that polysiloxanes which contain more than 10 SiH groups per molecule, can also be reacted with allyl-started polyether monools without gelling. At the same time, no crosslinking reactions are observed and the yields obtained are high. On the other hand, when $H_2PtCl_6.6H_2O$ is used as catalyst under comparable conditions, overall lesser conversions are achieved and, if the amount of catalyst is increased as a result of side reactions or further reactions, end products are obtained, whose viscosity increases up to the complete gelling of the reaction batch.

The selectivity of the catalysts is, of course, more pronounced if the hydroxyl groups, contained in the compounds with olefinic double bonds, are present not in the form of primary, but in the form of secondary hydroxyl groups.

After the addition reaction, it is advisable to remove the catalysts used in the inventive process from the end product.

For this purpose, the treatment of the reaction batch with a filter aid, such as, for example, bentonite, on which the catalysts are deposited, is, for example, suitable. Filter aid and catalyst can then be removed by filtering them off together, as a result of which the recovery of the platinum used as the catalyst, also becomes possible.

The inventive process is described in greater detail by the following examples. In this connection, the percentage SiH conversions, mentioned in the examples, is determined indirectly by treating the reaction product obtained with n-butanol in an alkaline medium and volumetrically determining the amount of hydrogen which can still be split off.

filtered and freed from toluene at 70° C. and approximately 20 mbar.

The results obtained with the different amounts of the individual catalysts are shown in the following table. In order to be able to make a better comparison, the amounts of catalyst, here as well as in the following examples, are given in ppm of platinum, based on the amounts used of the two reaction partners which are to be reacted.

The SiH conversion data and the viscosities of the end products, given in the table, show the advantage of the claimed compounds. At comparable platinum concentrations, the claimed compounds have a similar or, at times, higher catalytic activity, measured by the SiH conversion, than $H_2PtCl_6.6H_2O$. At the same time, the viscosities of the products are lower. This confirms that the side reactions, which partially lead to crosslinking, clearly take place to a lesser extent.

TABLE

| | | | ppm Pt (based on siloxane + polyether) | Percent SiH Conversion | | | | Viscosity of End Product in mPa × sec (at 20° C.) |
|---|---|---|---|---|---|---|---|---|
| No. | mg | Catalyst Compound | | after dropwise addition | after 1 hour | after 2.5 hours | after 4 hours | |
| 1 | 45.8 | cis-[PtCl$_2$(NH$_3$)$_2$] | 80 | 87.9 | 99.0 | 99.5 | — | 464 |
| 2 | 22.9 | " | 40 | 86.6 | 97.8 | 98.2 | 98.8 | 372 |
| 3 | 5.7 | " | 10 | 86.9 | 97.0 | 97.9 | — | 351 |
| 4 | 1.1 | " | 2 | 24.2 | 76.8 | 84.9 | 93.9 | 372 |
| 5 | 790 | H$_2$PtCl$_6$.6H$_2$O - 10% solution in i-propanol | 80 | 85.8 | 92.3 | 94.5 | — | 2683 |
| 6 | 395 | H$_2$PtCl$_6$.6H$_2$O - 10% solution in i-propanol | 40 | 84.1 | 93.5 | 93.7 | 94.1 | 882 |
| 7 | 98.8 | H$_2$PtCl$_6$.6H$_2$O - 10% solution in i-propanol | 10 | 77.8 | 92.1 | 93.1 | 93.4 | 414 |
| 8 | 19.8 | H$_2$PtCl$_6$.6H$_2$O - 10% solution in i-propanol | 2 | 37.7 | 70.0 | 76.1 | 85.2 | 328 |
| 9 | 49.0 | cis-[Pt(NO$_2$)$_2$(NH$_3$)$_2$] | 80 | 71.4 | 89.3 | 96.5 | — | 444 |
| 10 | 24.5 | " | 40 | 60.5 | 78.4 | 92.7 | 95.2 | 405 |
| 11 | 6.1 | " | 10 | 45.8 | 73.7 | 82.5 | 89.8 | 323 |

EXAMPLES 1-11

To a 4-neck flask, equipped with stirrer, thermometer, gas inlet and distillation head, were added 280 g (approx. 25% excess based on the SiH) of an allyl polyether monool with an iodine number of 29.9, whose OH groups were secondary and which contained 78 weight percent of ethylene oxide and 22 weight percent of propylene oxide in the polyoxyalkylene portion, in 520 ml of toluene. Under an atmosphere of nitrogen, 150 ml of toluene were distilled off in order to remove water azeotropically. Subsequently, the flask was provided with a reflux condenser and nitrogen was passed through the apparatus during the further reaction. In experiments 1 to 11, different amounts of platinum, in the form of cis-[PtCl$_2$(NH$_3$)$_2$], H$_2$PtCl$_6$.6H$_2$O (10% in i-propanol) or cis-[Pt(NO$_2$)$_2$(NH$_3$)$_2$] were added at a temperature of 105° C. and stirred in for 5 minutes. In every case now, 92 g of a siloxane with the average formula

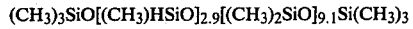

(CH$_3$)$_3$SiO[(CH$_3$)HSiO]$_{2.9}$[(CH$_3$)$_2$SiO]$_{9.1}$Si(CH$_3$)$_3$ were added dropwise over a period of 20 minutes. The conversion of SiH was determined directly after the addition and after a further 1, 2.5 and in some cases, 4 hours. After the reaction, the batches were mixed at 60° C. with 3.7 g of bentonite and stirred for 1 hour, then

EXAMPLE 12

Example 3 was repeated without toluene as solvent. The SiH conversion after 2 hours was 98.4%. The product obtained had a viscosity of 402 mPa×sec.

EXAMPLE 13

An approximately 25% excess (224 g) of an allyl polyether monool with an iodine number of 43.8, which contained 80 weight percent of ethylene oxide and 20 weight percent of propylene oxide in the polyoxyalkylene portion and whose hydroxyl groups were secondary, and 400 ml of toluene, were added to a flask, which was equipped with a stirrer, thermometer, gas inlet and distillation head and dried azeotropically by distilling over approximately 140 ml of toluene. The drying and further reaction were carried out while passing through nitrogen. The flask was then equipped with a reflux condenser and 10 ppm of platinum were added in the form of 5 mg of trans-[PtCl$_2$(NH$_3$)$_2$] at 105° C.

After 5 minutes, 100 g of a siloxane having the average composition of (CH$_3$)$_3$SiO[(CH$_3$)HSiO]$_{3.1}$[(CH$_3$)$_2$SiO[$_{8.8}$Si(CH$_3$)$_3$ were added dropwise over a period of 20 minutes and the batch was stirred for 2.5 hours at 105° C. Subsequently, 3 g of bentonite were stirred in at 60° C. One hour later, the batch was filtered and freed from toluene by distillation at 70° C. and 20 mbar. The product obtained was clear and almost colorless. Analysis revealed an SiH conversion of 97.1%. The product had a viscosity (20° C.) of 298 mPa×sec.

EXAMPLE 14

Example 13 was repeated using 5 ppm of platinum in the form of 2.5 mg of trans-[PtCl$_2$(NH$_3$)$_2$] and a reaction time of 4 hours. The SiH conversion was 87% and the viscosity at 20° C. 275 mPa×sec.

EXAMPLE 15

An approximately 15% excess (458 g) of an allyl polyether monool with an iodine number of 43, which contained primary hydroxyl groups and whose polyoxyalkylene portion was 85 weight percent of ethylene oxide and 15 weight percent of propylene oxide and 200 g of a hydrogen siloxane of the average formula $$(CH_3)_3SiO[(CH_3)_3HSiO]_{3.1}[(CH_3)_2SiO]_{8.8}Si(CH_3)_3$$

were reacted in 650 ml of toluene as a solvent in the presence of 10 ppm of platinum in the form of 10.2 mg of cis-[PtCl$_2$(NH$_3$)$_2$]. The apparatus and procedure were similar to those of Example 13, with the exception that the reaction was carried out at a temperature of 75°–80° C. After 2 hours of reaction time, the batch was treated with 6 g of bentonite. The conversion of SiH had reached 99.2% and the viscosity at 20° C. was 310 mPa×sec.

EXAMPLE 16

An approximately 20% excess (269 g) of the allyl polyether monool used in Example 13 (iodine number=43.8) and 142 g of a hydrogen siloxane with the average formula $$(CH_3)_3SiO[(CH_3)HSiO]_{5.8}[(CH_3)_2SiO]_{21.9}Si(CH_3)_3$$

were reacted in 400 ml of toluene in the presence of 10 ppm of platinum in the form of 6.3 mg of cis-[PtCl$_2$(NH$_3$)$_2$]. The batch was treated with 2 g of bentonite. Otherwise, the conditions of Example 13 were followed. The conversion of SiH was 97% and the viscosity (20° C.) was 439 mPa×sec.

EXAMPLE 17

An approximately 25% excess (240 g) of the allyl polyether monool used in Example 13 (iodine number 43.8) and 123 g of a hydrogen siloxane with the average formula $$(CH_3)_3SiO[(CH_3)HSiO]_{11.6}[(CH_3)_2SiO]_{46.4}Si(CH_3)_3$$

were reacted in 360 ml of toluene in the presence of 10 ppm of platinum in the form of 5.6 mg of cis-[PtCl$_2$(NH$_3$)$_2$]. The reaction was carried out at 113°–115° C. The siloxane was added dropwise during 45 minutes. The batch was treated with 3 g of bentonite. In other respects, the conditions of Example 13 were followed. The conversion of SiH reached 97.4% and the product obtained had a viscosity of 1057 mPa×sec. at 20° C.

EXAMPLE 18

An approximately 10% excess (1260 g) of an allyl polyether monool with an iodine number of 17, which contained secondary hydroxyl groups and whose polyoxyalkylene portion was 15 weight percent of ethylene oxide and 85 weight percent of propylene oxide, and 50 g of a hydrogen siloxane with an average formula of $$(CH_3)_3SiO[(CH_3)HSiO]_{30.5}Si(CH_3)_3$$

were reacted in 1300 ml of toluene in the presence of 20 ppm of platinum in the form of 40.3 mg of cis-[PtCl$_2$(NH$_3$)$_2$]. The batch was treated with 13 g of bentonite. The siloxane was added dropwise over a period of 35 minutes. The reaction temperature was 112° C. Otherwise, the conditions of Example 13 were followed. An SiH conversion of 89% was reached and the viscosity was 2390 mPa×sec. at 20° C.

EXAMPLE 19

Example 18 was repeated with the alteration that 20 ppm of platinum were used in the form of H$_2$PtCl$_6$.6H$_2$O (10% solution in i-propanol). The product obtained was a gel which no longer flowed.

EXAMPLE 20

This example is intended to show the slight effect that the claimed compounds have on the reaction ≡SiH+ ≡COH→≡SiOC≡+H$_2$. An approximately 25% excess (433 g) of an allyl polyether monool with an iodine number of 29.9, which contained secondary hydroxyl groups and whose polyoxyalkylene portion was 78 weight percent of ethylene oxide and 22 weight percent of propylene oxide, was reacted with 132 g of a siloxane with the average formula of $$(CH_3)_3SiO[(CH_3)HSiO]_{3.1}[(CH_3)_2SiO]_{8.8}Si(CH_3)_3$$

in the presence of 15 ppm of platinum in the form of 13 mg of cis-[PtCl$_2$(NH$_3$)$_2$].

The reaction was carried out as follows. The azeotropically dried, toluene-free polyether was added to a one liter 4-neck flask, equipped with stirrer, thermometer and gas inlet and heated to 100° C. while dried nitrogen was being passed through. One after the other, the catalyst and the hydrogen siloxane were added now rapidly and all at once to the polyether. The nitrogen inlet was removed, the flask closed off completely and the batch stirred for 2.5 hours at 100° C. After cooling, the hydrogen content was determined in the gas phase above the reaction product. The amount of hydrogen found, 1.1 ml absolute, revealed that side reactions amounted to 0.012% based on the hydrogen used in the form of SiH groups. The conversion of SiH was determined to be 99.3%.

EXAMPLE 21

An allyl polyether was used, which had a methoxy instead of a hydroxy terminal group. The iodine number of the polyether was 28.9 and it contained 80 weight percent of ethylene oxide and 20 weight percent of propylene oxide in the polyoxyalkylene portion. A 15% excess (313 g) of this methoxy-terminated allyl polyether and 100 g of a hydrogen siloxane with the average formula of $$(CH_3)_3SiO[(CH_3)HSiO]_{3.1}[(CH_3)_2SiO]_{8.8}Si(CH_3)_3$$

were reacted in 400 ml toluene in the presence of 20 ppm of platinum in the form of 1.27 g of a 1% solution of cis-[PtCl$_2$(NH$_3$)$_2$] in dimethylformamide. The batch was treated with 4 g of bentonite. In other respects, the conditions of Example 13 were followed. The conversion of SiH was 95.5% and the viscosity at 20° C. was 339 mPa×sec.

EXAMPLE 22

An approximately 15% excess (150 g) of an allyl polyether monool with an iodine number of 86, which had been obtained by the addition of propylene oxide to allyl alcohol, and 117 g of a hydrogen siloxane with the average formula $(CH_3)_3SiO[(CH_3)HSiO]_{4.4}[(CH_3)_2SiO]_{3.8}[CH_3(C_6H_5)SiO]_{3.4}Si(CH_3)_3$ were reacted in 150 ml of toluene in the presence of 10 ppm of platinum in the form of 4.1 mg of cis-[PtCl$_2$(NH$_3$)$_2$]. The batch was treated with 2.5 g of bentonite. In other respects, the conditions of Example 13 were followed. The SiH conversion was 97.5%.

EXAMPLE 23

An approximately 25% excess (346 g) of an allyl polyether monool with an iodine number of 8.8, which contained secondary hydroxyl groups and whose polyoxyalkylene portion consisted to the extent of 35 weight percent of ethylene oxide and to the extent of 65 weight percent of propylene oxide, and 71 g of a hydrogen siloxane of the average formula $(CH_3)_3SiO[(CH_3)HSiO]_{4.8}[(CH_3)_2SiO]_{22.6}[CH_3(ClCH_2CH_2CH_2)SiO]_{10.5}Si(CH_3)_3$ were reacted in 450 ml of toluene in the presence of 15 ppm of platinum in the form of 0.96 g of a 1% solution of cis-[PtCl$_2$(NH$_3$)$_2$] in dimethylformamide. The batch was treated with 4 g of bentonite. In other respects, the conditions of Example 13 were followed. The SiH conversion was 94.8% and the product had a viscosity of 1580 mPa×sec. at 20° C.

EXAMPLE 24

To a 4-neck flask, equipped with stirrer, thermometer, reflux condenser and gas inlet, 126 g of allyl glycidyl ether (approximately 10% excess) and 10 ppm of platinum in the form of 5.7 mg of cis-[PtCl$_2$(NH$_3$)$_2$] were added. Under an atmosphere of nitrogen, 245 g of a hydrogen siloxane of the average formula $H(CH_3)_2SiO[(CH_3)_2SiO]_{4.8}Si(CH_3)_2H$ were added dropwise at 100° C. over a period of 30 minutes. The batch was stirred for 1.5 hours at 100° C. Subsequently, 3.7 g of bentonite were stirred in at 60° C. After 1 hour, the batch was filtered. The SiH conversion had reached 99% and the viscosity of the product was 11.8 mPa×sec at 20° C.

We claim:
1. In a process for the addition of silanes or siloxanes having SiH groups and are free of substituents which, after splitting off from the silicon atom, act as proton acceptors, to compounds with olefinic double bonds in the presence of an effective amount of a catalyst of the platinum group, the improvement which comprises said catalysts having the general formula

$YX_2(NH_3)_2$ in which
Y is a platinum or palladium radical, and
X is a chlorine, bromine, iodine or the NO$_2$ group.
2. The process of claim 1 wherein the catalyst is [PtCl$_2$(NH$_3$)$_2$].
3. The process of claim 1 or 2 wherein the catalyst is in its cis form.
4. The process of claim 1 or 2 wherein the amount of catalyst is from about $10^{-2}$ to $10^{-8}$ moles per mole of SiH groups in the silane or siloxane used.
5. The process of claim 1 or 2 wherein the amount of catalyst is from about $10^{-3}$ to $10^{-6}$ moles per mole of SiH groups in the silane or siloxane used.
6. The process of claim 1 or 2 wherein the catalyst is dispersed in the compound having the olefinic double bonds and the silane or siloxane, having SiH groups, is added thereto.
7. The process of claim 6 wherein the addition reaction is carried out in the presence of a solvent which is inert with respect to the reaction.

* * * * *